(12) United States Patent
Lee et al.

(10) Patent No.: US 11,946,610 B2
(45) Date of Patent: Apr. 2, 2024

(54) VEHICLE LAMP WITH ROTATABLE MOVABLE UNIT FOR ROAD SURFACE PATTERN EMISSION

(71) Applicant: SL Corporation, Daegu (KR)

(72) Inventors: Jong Min Lee, Gyeongsan-si (KR); Jong Woon Kim, Gyeongsan-si (KR); Hye Jin Park, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/170,607

(22) Filed: Feb. 17, 2023

(65) Prior Publication Data
US 2023/0194065 A1    Jun. 22, 2023

Related U.S. Application Data

(63) Continuation of application No. PCT/KR2021/012563, filed on Sep. 15, 2021.

(30) Foreign Application Priority Data

Sep. 28, 2020   (KR) .......................... 10-2020-0125642

(51) Int. Cl.
*F21S 41/657*   (2018.01)
*F21S 41/32*    (2018.01)
*F21S 43/19*    (2018.01)
*F21S 43/31*    (2018.01)

(52) U.S. Cl.
CPC ............. *F21S 41/657* (2018.01); *F21S 41/32* (2018.01); *F21S 43/19* (2018.01); *F21S 43/31* (2018.01)

(58) Field of Classification Search
CPC . F21S 41/657; B60Q 2400/50; B60Q 1/2665; F21W 2103/60
See application file for complete search history.

(56) References Cited

U.S. PATENT DOCUMENTS 10,386,043 B1 * 8/2019 Lim ...................... B60Q 1/085
10,391,929 B1 * 8/2019 McNabb ............. B60Q 1/2665

* cited by examiner

*Primary Examiner* — Robert J May
(74) *Attorney, Agent, or Firm* — United One Law Group LLC; Kongsik Kim; Jhongwoo Peck

(57) ABSTRACT

A vehicle lamp for emitting light at various locations adjacent to a vehicle while having a simplified configuration is provided. A vehicle lamp includes a light-emitting unit that emits light to form a road surface pattern, and a movable unit on which the light-emitting unit is mounted. The light generated by the light-emitting unit enables the road surface pattern to be formed on different locations of a road surface adjacent to the vehicle as the movable unit rotates.

15 Claims, 12 Drawing Sheets

VEHICLE LAMP WITH ROTATABLE MOVABLE UNIT FOR ROAD SURFACE PATTERN EMISSION

CROSS-REFERENCE TO RELATED APPLICATIONS

The present application is a Continuation of International Application No. PCT/KR2021/012563 filed on Sep. 15, 2021, which claimed priority from Korean Application No. 10-2020-0125642 filed on Sep. 28, 2020. The aforementioned applications are incorporated herein by reference in their entireties.

TECHNICAL FIELD

The present disclosure relates to a vehicle lamp, and more particularly, to a vehicle lamp that enables light to be radiated to various positions around a vehicle while having a simplified configuration.

RELATED ART

In general, a vehicle is provided with various types of lamps for an illumination function to allow a driver to more easily identify an object located around the vehicle during low light conditions (e.g., night-time driving), and a signaling function to allow the driver to inform surrounding vehicles or pedestrians of the vehicle's driving status.

For example, head lamps and fog lamps are mainly for the illumination functions, and daytime running lamps, position lamps, turn signal lamps, tail lamps, and brake lamps are mainly for the signaling functions. An installation standard and specifications of each of the lamps are stipulated in the laws and regulations so that the lamp can fully perform the required functions.

Recently, since information that can be delivered with only the illumination or signaling function is limited, a study to provide more diverse information to the driver or surrounding vehicles by forming a road surface pattern representing information to be delivered to various locations on a road surface around the vehicle is actively underway.

The vehicle lamp may be required to have a light irradiation direction that varies based on a function thereof. When separate vehicle lamps are provided for each function, the number of parts or a cost increases. For this reason, an approach for simplifying the configuration of the lamp and allowing the lamp to irradiate light to various locations around the vehicle is required.

SUMMARY

Aspects of the present disclosure provide a vehicle lamp in which the same components are used for irradiating light to different locations around the vehicle. However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a vehicle lamp may include a light emitter that emits light to form a road surface pattern; and a movable unit on which the light emitter is mounted. In particular, a position of the road surface pattern formed by the light emitter around the vehicle may be adjustable as the movable unit rotates.

The light emitter may include a light source unit for emitting first light; a light adjuster for generating second light having a different light concentration from the first light; and a mirror for reflecting the second light to a position where the road surface pattern is to be formed. Further, the light source unit may include a plurality of light sources for respectively emitting light beams of different wavelengths; and an optical member for synthesizing the light beams emitted from the plurality of light sources to generate the first light. The light source unit may further include a plurality of light path adjusters for respectively adjusting light paths of the light beams respectively emitted from the plurality of light sources to cause the light beams to propagate parallel to one another. A distance between one of the plurality of light sources and corresponding one of the plurality of light path adjusters may be configured based on a wavelength of each light beam emitted from the one of the plurality of light sources.

The light adjuster may include a plurality of lenses arranged along a propagating direction of the first light. In some embodiments, the plurality of lenses may have different effective areas. In some embodiments, the plurality of lenses may have different curvatures.

The vehicle lamp may further comprise a housing for accommodating at least one of the light source, the light adjuster, or the mirror, and the housing may have at least one opening defined therein to allow light propagating within the light emitter to be inspected.

The movable unit may be installed at an outside mirror disposed at each of both opposing sides of the vehicle.

The position of the road surface pattern formed on the road surface may move in a front-rear direction of the vehicle as the movable unit rotates.

The movable unit may include an aperture that extends in a direction so as to have an acute angle with respect to at least one of a front-rear direction, a vertical direction, or a left-right direction of the vehicle, and a shaft may be inserted into the aperture, serving as a rotation axis of the movable unit. The movable unit may be oriented so as to have an acute angle with respect to at least one of a front-rear direction, a vertical direction, or a left-right direction of the vehicle.

As the movable unit rotates, the position of the road surface pattern may be adjusted such that a spacing in a left-right direction of the vehicle between a central axis passing through a center of the vehicle in a front-rear direction of the vehicle and a center of the road surface pattern is varied. Accordingly, the road surface pattern may be formed on one of a front road surface in front of the vehicle, a side road surface on a side of the vehicle, or a rear road surface in rear of the vehicle, based on a position of the movable unit. Further, a spacing in the left-right direction between a center of a road surface pattern formed on the side road surface and the central axis of the vehicle may be larger than a spacing in the left-right direction between a center of a road surface pattern formed on the front road surface or the rear road surface and the central axis of the vehicle.

The movable unit may be rotatable to allow the light emitted from the light emitter to be irradiated upwardly. The movable unit may be rotatable in a range of about 270 degrees.

Other details of the present disclosure are included in the detailed descriptions and drawings.

According to the vehicle lamp of the present disclosure, there are one or more of the following effects. A propagation direction of the light emitted from the light emitter mounted on the movable unit may be adjusted by adjusting a position of the movable unit. Thus, the same components may be used for irradiating light to different locations around the vehicle, thereby simplifying the configuration of the lamp. However, the effects of the embodiments are not restricted to those set forth herein. The above and other effects of the embodiments will become more apparent to one of ordinary skill in the art to which the present disclosure pertains.

DETAILED DESCRIPTION

Advantages and features of the present disclosure, and methods for achieving the same will become clear with reference to embodiments as described below in detail in conjunction with the accompanying drawings. However, the present disclosure is not limited to the embodiments as disclosed below and may be implemented in various different forms. These embodiments are provided to make the disclosure of the present disclosure complete and to completely inform those skilled in the art of the scope of the present disclosure. The scope of the present disclosure is defined only by the scope of the claims. The same reference numbers refer to the same components throughout the present disclosure.

Thus, in some embodiments, well-known process steps, well-known structures and well-known techniques are not described in detail in order to avoid ambiguous interpretation of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items.

Further, the embodiments as described in the present disclosure will be described with reference to cross-sectional views and/or schematic diagrams as ideal illustrative diagrams of the present disclosure. Accordingly, a form of each of the illustrative drawings may be modified due to manufacturing techniques and/or tolerances. Therefore, the embodiments of the present disclosure are not limited to specific forms as shown, and may include changes in the form occurring according to a manufacturing process. In addition, in each of the drawings as shown in the present disclosure, a size of each component may be somewhat enlarged or reduced in consideration of convenience of the illustration. Like reference numbers designate like elements throughout the present disclosure.

Hereinafter, the present disclosure will be described with reference to drawings for illustrating a vehicle lamp according to embodiments of the present disclosure.

Figure 1:
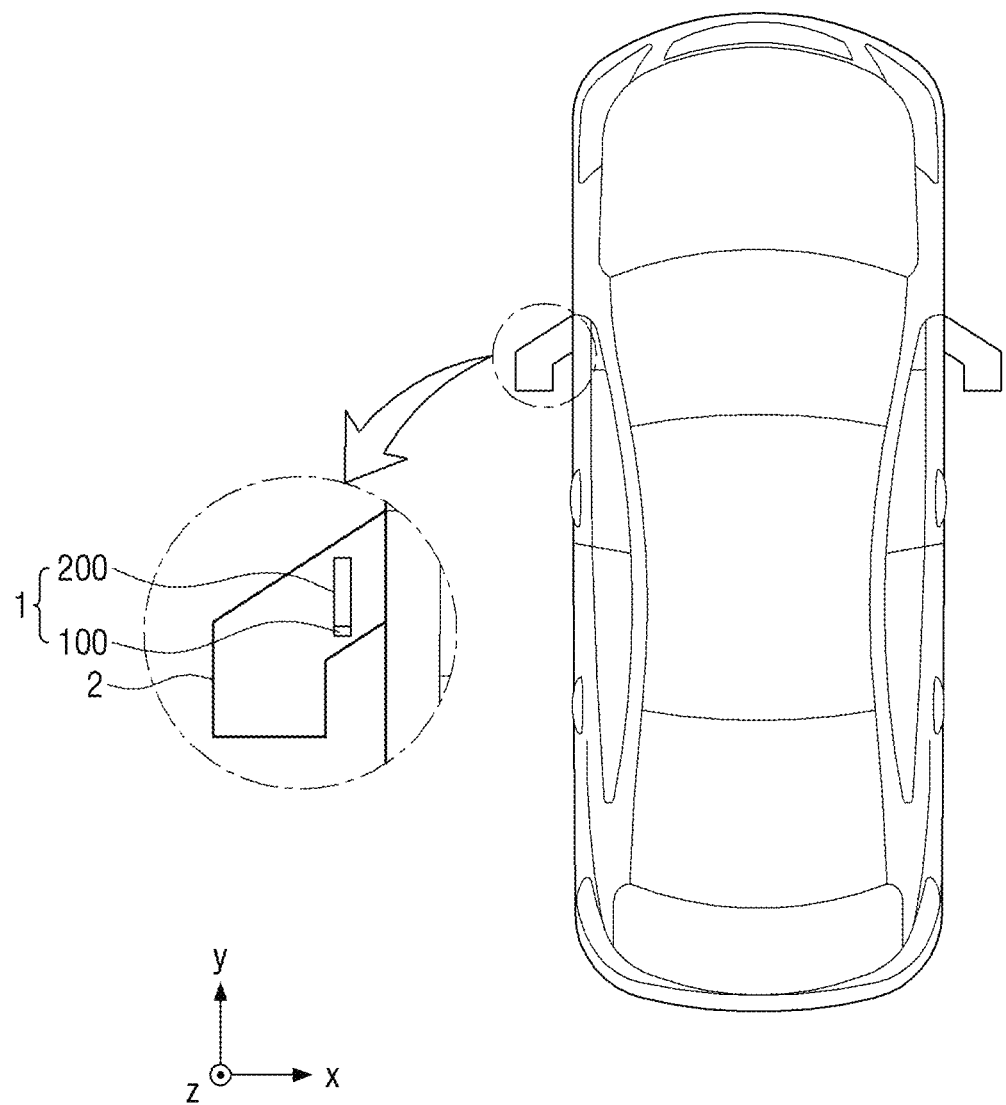
FIG. 1 is a schematic diagram showing a vehicle in which a vehicle lamp according to an embodiment of the present disclosure is installed.

FIG. 1 is a schematic diagram showing a vehicle lamp according to an embodiment of the present disclosure. Referring to FIG. 1, a vehicle lamp 1 according to an embodiment of the present disclosure may include a light emitter 100 and a movable unit 200.

In an embodiment of the present disclosure, a case in which the vehicle lamp 1 functions to form a road surface pattern having a predetermined shape representing various information that needs to be delivered to a driver, drivers of nearby vehicles, pedestrians, etc. at a predetermined position on a road surface around the vehicle will be described by way of example. However, the present disclosure is not limited thereto, and the vehicle lamp 1 according to the present disclosure may have functions of various lamps installed in the vehicle.

Further, in an embodiment of the present disclosure, a case in which the vehicle lamp 1 is installed on an outside mirror 2 installed at each of both opposing sides of the vehicle to secure a rear view of the vehicle or a side-rear view of the vehicle will be described by way of example. However, this is merely an example to help understanding of the present disclosure. The present disclosure is not limited thereto, and the vehicle lamp 1 according to the present disclosure may be installed at various positions such as a vehicle body or a wheel as long as the vehicle lamp is capable of forming the road surface pattern on a road surface around the vehicle.

The outside mirror 2 may be formed to be partially open or partially made of a transparent material through which light may transmit, corresponding to a propagating direction of light emitted from the vehicle lamp 1 of the present disclosure such that the light emitted from the vehicle lamp 1 may be irradiated to a predetermined position on the road surface around the vehicle.

Further, FIG. 1 shows an example in which a camera instead of a mirror is disposed in the outside mirror 2, and a rear view or side-rear view image captured by the camera is displayed on a display device provided inside the vehicle. The present disclosure is not limited thereto, however, and may be equally applied to a case where a mirror instead of a camera is provided in the outside mirror 2.

The light emitter 100 may emit light having an amount and/or a color suitable for the road surface pattern to be formed on the road surface around the vehicle.

Figure 2:
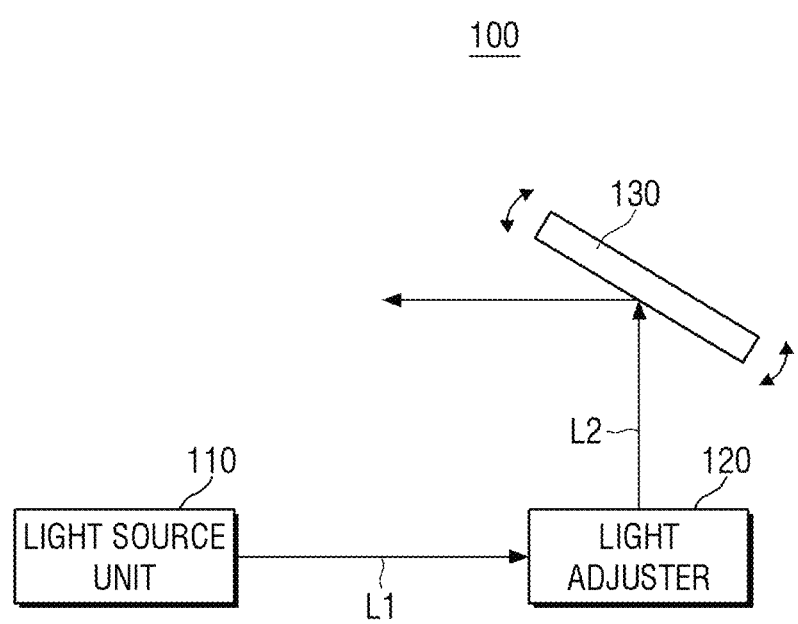
FIG. 2 is a block diagram showing a configuration of a light emitter according to an embodiment of the present disclosure.
Figure 3:
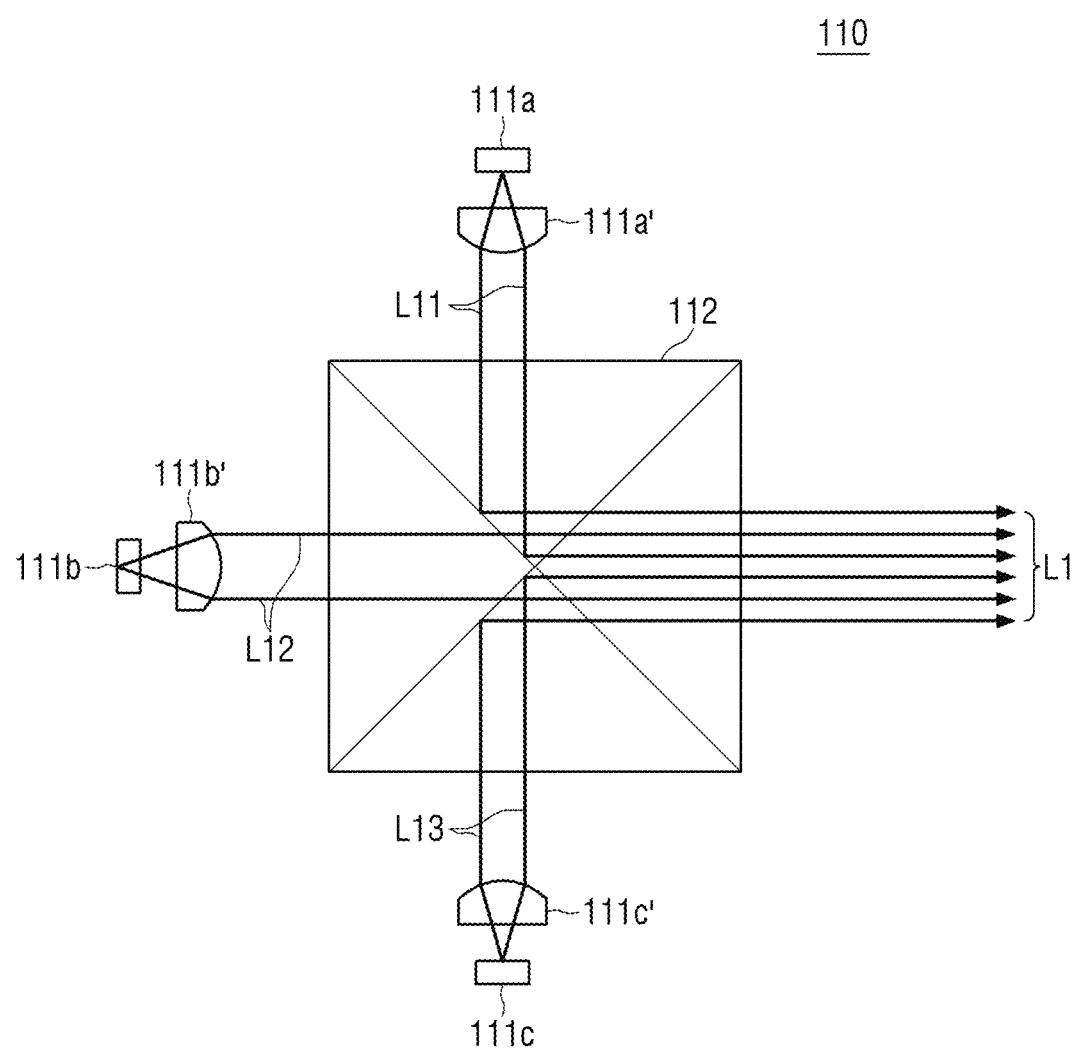
FIG. 3 is a schematic diagram showing a light source according to an embodiment of the present disclosure.
Figure 4:
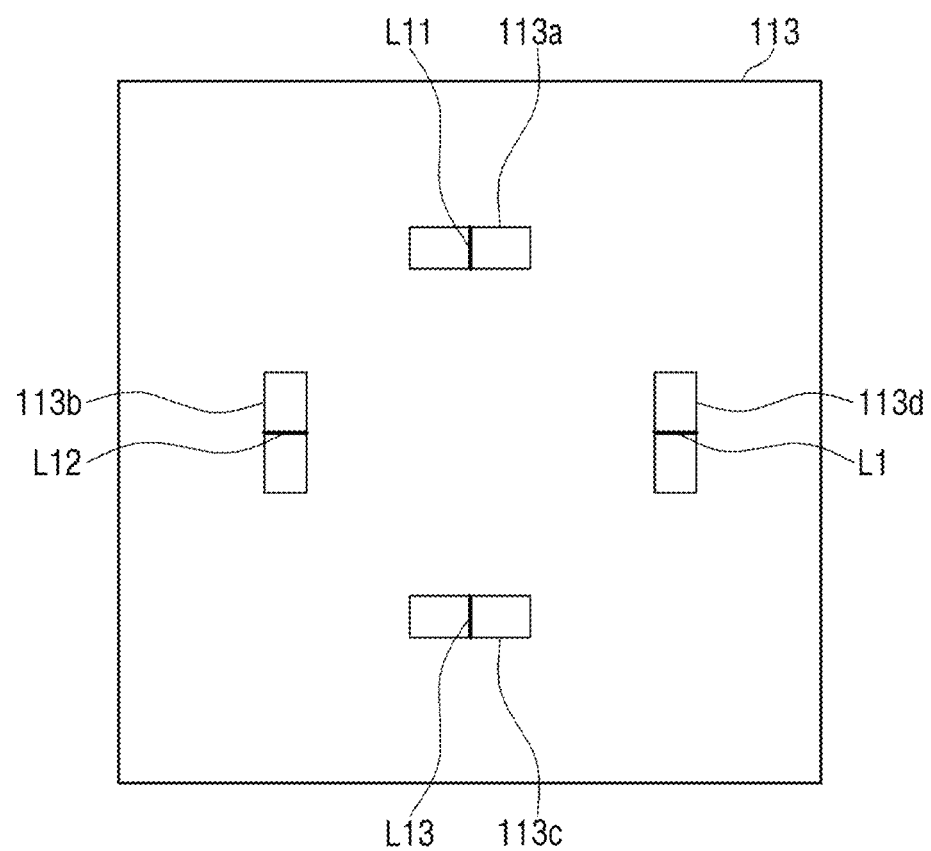
FIG. 4 is a schematic diagram showing a housing of a light source according to an embodiment of the present disclosure.
Figure 5:
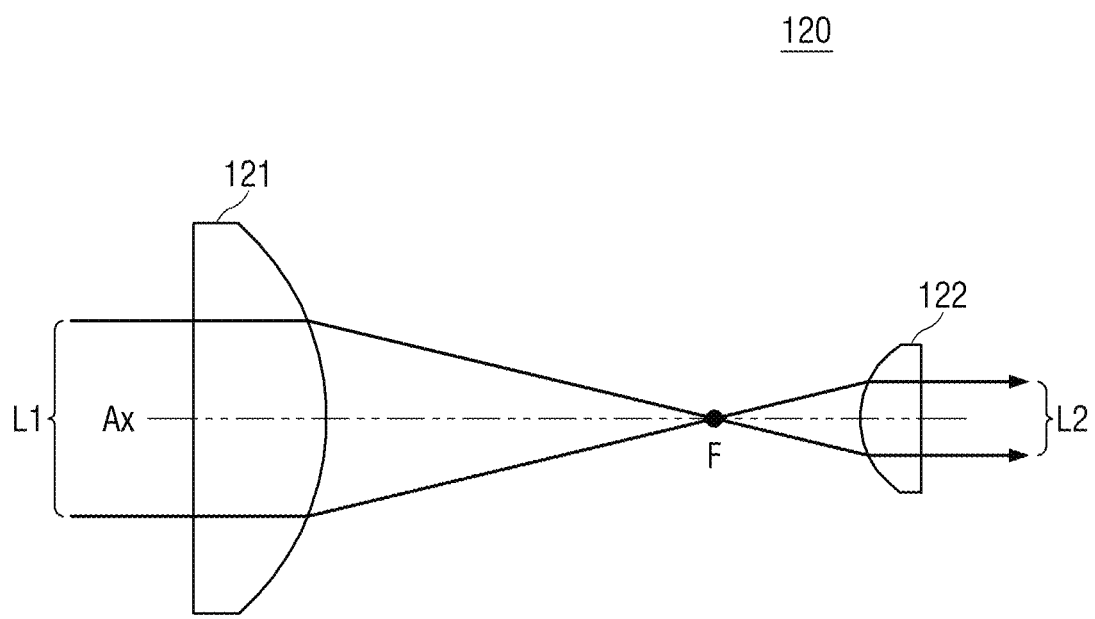
FIG. 5 is a schematic diagram showing a light adjuster according to an embodiment of the present disclosure.

FIG. 2 is a schematic diagram showing a light emitter according to an embodiment of the present disclosure. FIG. 3 is a schematic diagram showing a light source according to an embodiment of the present disclosure. FIG. 4 is a schematic diagram showing a housing of a light source according to an embodiment of the present disclosure. FIG. 5 is a schematic diagram showing a light adjuster according to an embodiment of the present disclosure.

Referring to FIGS. 2 to 5, the light emitter 100 according to an embodiment of the present disclosure may include a light source unit 110, a light adjuster 120, and a mirror 130.

The light source unit 110 may include a plurality of light sources 111a, 111b, and 111c and an optical member 112 that synthesizes light beams respectively emitted from the plurality of light sources 111a, 111b, and 111c to generate first light L1. In accordance with the present disclosure, the plurality of light sources 111a, 111b, and 111c may generate light beams of different colors (wavelengths), respectively. However, the present disclosure is not limited thereto, and the number of the plurality of light sources 111a, 111b, and 111c or colors of the light beams may be variously changed based on a color of light required for the vehicle lamp 1 according to the present disclosure.

In an embodiment of the present disclosure, a case in which a laser diode (LD) is used as each of the plurality of light sources 111a, 111b, and 111c will be described by way of example. However, the present disclosure is not limited thereto, and each of the plurality of light sources 111a, 111b, and 111c may be embodied as not only the laser diode (LD) but also various types of light sources such as a Light Emitting Diode (LED) and a bulb.

Light paths of the light beams L11, L12, and L13 respectively emitted from the plurality of light sources 111a, 111b, and 111c may be respectively adjusted via a plurality of light path adjusters 111a', 111b', and 111c' to allow each of the light beams L11, L12, and L13 to propagate as a parallel beam. In an embodiment of the present disclosure, a case in which an aspherical lens is used as each of the plurality of light path adjusters 111a', 111b', and 111c' will be described by way of example. However, the present disclosure is not limited thereto, and each of the plurality of light path adjusters 111a', 111b', and 111c' may include not only the aspherical lens but also a collimator lens such as a Total Internal Reflection (TIR) lens, or a Fresnel lens and a reflector that reflects the light beam emitted from each of the plurality of light sources 111a, 111b, and 111c to the optical member 112.

Further, a distance between each corresponding one of the plurality of light sources 111a, 111b, and 111c and each corresponding one of the plurality of light path adjusters 111a', 111b', and 111c' may be determined based on a wavelength of the light beam emitted from each corresponding one of the plurality of light sources 111a, 111b, and 111c.

For example, when a red light beam, a green light beam, and a blue light beam are emitted from the plurality of light sources 111a, 111b, and 111c, respectively, a distance between the light source corresponding to the blue light beam and the light path adjuster corresponding to the blue light beam may be the largest, while a distance between the light source corresponding to the red light beam and the light path adjuster corresponding to the red light beam may be the smallest. This is because a lens has different refractive indices for different wavelengths of the light beams L11, L12 and L13 respectively emitted from the plurality of light sources 111a, 111b, and 111c, and a focal length of the lens depends on the refractive index.

The light source unit 110 may be configured such that the plurality of light sources 111a, 111b, and 111c, the plurality of light path adjusters 111a', 111b', and 111c', and the optical member 112 are accommodated in a housing 113. The housing 113 may have at least one opening 113a, 113b, 113c, and 113d defined therein, through which at least one of the light beams respectively propagating in the plurality of light sources 111a, 111b, and 111c, the plurality of light path adjusters 111a', 111b', and 111c', and the optical members 112 may be inspected.

FIG. 4 shows an example where the openings 113a, 113b, and 113c for identifying the light beams L11, L12, and L13 respectively emitted from the plurality of light sources 111a, 111b, and 111c are formed, and the opening 113d for identifying the first light L1 generated from the optical member 112 is formed in the housing 113. However, the present disclosure is not limited thereto, and the position and/or the number of the openings may be variously modified based on the position and/or the number of the light beams to be identified.

In this regard, a light-reception sensor such as a photodiode may be provided in the at least one opening 113a, 113b, 113c, and 113d formed in the housing 113. A detection result by the light-reception sensor may be used to determine whether the light is properly generated and propagates. Thus, failure may be detected based on the result of the determination.

In an embodiment of the present disclosure, a case in which the plurality of light sources 111a, 111b, and 111c, the plurality of light path adjusters 111a', 111b', and 111c' and the optical member 112 are accommodated in the housing 113 is described by way of example. However, the present disclosure is not limited thereto, and at least one of the components of the light emitter 100, including the light source unit 110, may be accommodated in the housing 113.

The optical member 112 may synthesize light beams respectively emitted from at least one of the plurality of light sources 111a, 111b, and 111c to generate synthesized light. The synthesized light generated by the optical member 112 may be referred to as the first light L1 emitted from the light source unit 110. FIG. 3 as described above is an example in which the light beams are respectively emitted from all of the plurality of light sources 111a, 111b, and 111c.

At least one of a surface of the optical member 112 on which light is incident or a surface thereof from which the light is emitted may be coated with an anti-reflective material. This is because when a portion of the light that passes through the optical member 112 is reflected from an interface of the optical member 112, the amount of the first light L1 generated by the optical member 112 may be reduced, and in such case, in order to obtain a required amount of light, the amount of each of the light beams to be respectively emitted from the plurality of light sources 111a, 111b, and 111c should be further increased.

In an embodiment of the present disclosure, a case in which a prism is used as the optical member 112 will be described by way of example. However, the present disclosure is not limited thereto. The optical member 112 may be embodied as not only the prism, but also various optical elements such as a dichroic mirror, which transmits a particular band of wavelengths and reflects another band thereof so as to enable light synthesis.

The light adjuster 120 may generate second light L2 having a different concentration than that of the first light L1 emitted from the light source unit 110. In an embodiment of the present disclosure, adjusting the degree of condensation of light using the light adjuster 120 may improve the sharpness of the road surface pattern formed on the road surface around the vehicle by the vehicle lamp 1 according to the present disclosure. In an embodiment of the present disclosure, a case where the degree of light condensation may be adjusted to be higher by the light adjuster 120 so that sufficient sharpness may be secured even when a position on the road surface around the vehicle where the road surface pattern is formed is changed will be described by way of example.

The light adjuster 120 may include a plurality of lenses 121 and 122 arranged along a propagating direction of light. Hereinafter, in an embodiment of the present disclosure, the plurality of lenses 121 and 122 will be referred to as a first lens 121 and a second lens 122, respectively.

The first lens 121 may be disposed closer to the light source unit 110 than the second lens 122, along the propagating path of the first light L1 emitted from the light source unit 110. In an embodiment of the present disclosure, a case where the first lens 121 and the second lens 122 are disposed so as to have a coinciding optical axis Ax is described by way of example. However, the present disclosure is not limited thereto. When an optical element capable of changing the propagation path of light, such as a mirror or a reflector is disposed between the first lens 121 and the second lens 122, the first lens 121 and the second lens 122 may have different optical axes.

In this regard, in an embodiment of the present disclosure, since a case where the light adjuster 120 concentrates the first light L1 emitted from the light source unit 110 is described, an effective area of the second lens 122 may be smaller than an effective area of the first lens 121. The effective area of the lens refers to an area that affects a path of incident light among the entire area of the lens, and may be an area defined by at least one radius from an optical axis of the lens. The effective area of the lens may be the entire area or a partial area of the lens.

FIG. 5 shows an example where an entire area of each of the first lens 121 and the second lens 122 is an effective area, and the second lens 122 has a smaller size than the first lens 121 so that the light is concentrated. However, the present disclosure is not limited thereto. Even when the first lens 121 and the second lens 122 have a substantially equal size, the position of a focal point F between the first lens 121 and the second lens 122 may be adjusted by adjusting curvatures of the first lens 121 and the second lens 122 such that the effective areas of the first lens 121 and the second lens 122 may be different from each other.

The mirror 130 may adjust the direction in which the second light L2 whose degree of concentration is adjusted by the light adjuster 120 is irradiated. When a position (e.g., orientation) of the mirror 130 is adjusted, the direction in which light is reflected from the mirror 130 may be adjusted so that the direction in which the light emitted from the light emitter 100 propagates may thus be adjusted.

In an embodiment of the present disclosure, a case in which the direction of the second light L2 is adjusted by rotating (e.g., tilting) the mirror 130 will be described by way of example. However, the present disclosure is not limited thereto, and the position of the mirror 130 may be adjusted via a rotational motion, a linear motion, or a combination thereof.

Referring back to FIG. 1, the movable unit 200 according to an embodiment of the present disclosure may have one end on which the light emitter 100 is mounted. When the position of the movable unit 200 is adjusted, the propagating direction of the light L emitted from the light emitter 100 may be adjusted, so that the position on the road surface around the vehicle where the road surface pattern is formed may be adjusted. The light L emitted from the light emitter 100 may refer to the second light L2 generated by the light adjuster 120.

In other words, when the position of the light emitter 100 is fixed, there is a limitation in adjusting the direction of light emitted from the light emitter 100 by adjusting the position of the mirror 130. Thus, the light may not propagate in more various directions around the vehicle. However, in an embodiment of the present disclosure, as the position of the movable unit 200 on which the light emitter 100 is mounted is adjusted, the road surface pattern may be formed at substantially more various locations such as a road surface in front of the vehicle, in rear of the vehicle, and on sides of the vehicle.

Figure 6:
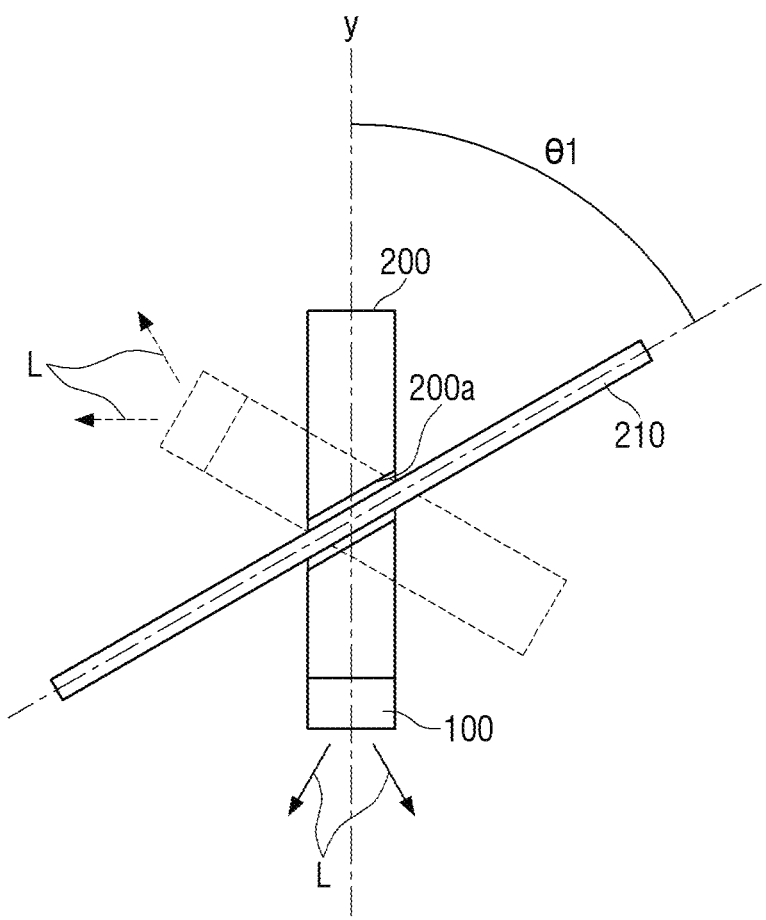
FIG. 6 is a schematic diagram showing a movable unit according to an embodiment of the present disclosure.

FIG. 6 is a schematic diagram showing a movable unit according to an embodiment of the present disclosure. Referring to FIG. 6, the movable unit 200 according to the embodiment of the present disclosure may be rotated around a shaft 210 as a rotation axis so as to adjust the propagating direction of the light emitted from the light emitter 100.

In this regard, an aperture 200a through which the shaft 210 extends may be formed in the movable unit 200. In an embodiment of the present disclosure, the aperture 200a may extend by being inclined with respect to a left-right direction x so as to have an acute angle θ1 with respect to a front-rear direction y. Accordingly, the shaft 210 may extend while being inclined so as to have the acute angle θ1 with respect to the front-rear direction y. Hereinafter, in an embodiment of the present disclosure, a case in which the left-right direction x refers to a width direction (e.g., lateral direction) of the vehicle, and the front-rear direction y refers to a driving direction (e.g., longitudinal direction) of the vehicle will be described by way of example.

In an embodiment of the present disclosure, a case where the aperture 200a extends in the left-right direction x in an inclined manner so as to have the acute angle θ1 with respect to the front-rear direction y is described by way of example. However, the present disclosure is not limited thereto. The aperture 200a may extend so as to have an acute angle with respect to at least one of the front-rear direction y, the left-right direction x, or a vertical direction z. Herein, the vertical direction z may refer to a height direction of the vehicle.

Due to the aperture 200a that is inclined by the acute angle θ1 with respect to the front-rear direction y, when the movable unit 200 rotates, the position on the road surface around the vehicle where the road surface pattern is formed may be adjusted along the front-rear direction y based on the rotation direction and the rotation angle of the movable unit 200, and at the same time, the lateral spacing in the left-right direction x between the location where the road surface pattern is formed and a central axis C of the vehicle that passes through the center of the vehicle in the front-rear direction y may be varied based on the rotation direction and angle of the movable unit 200.

Figure 7:
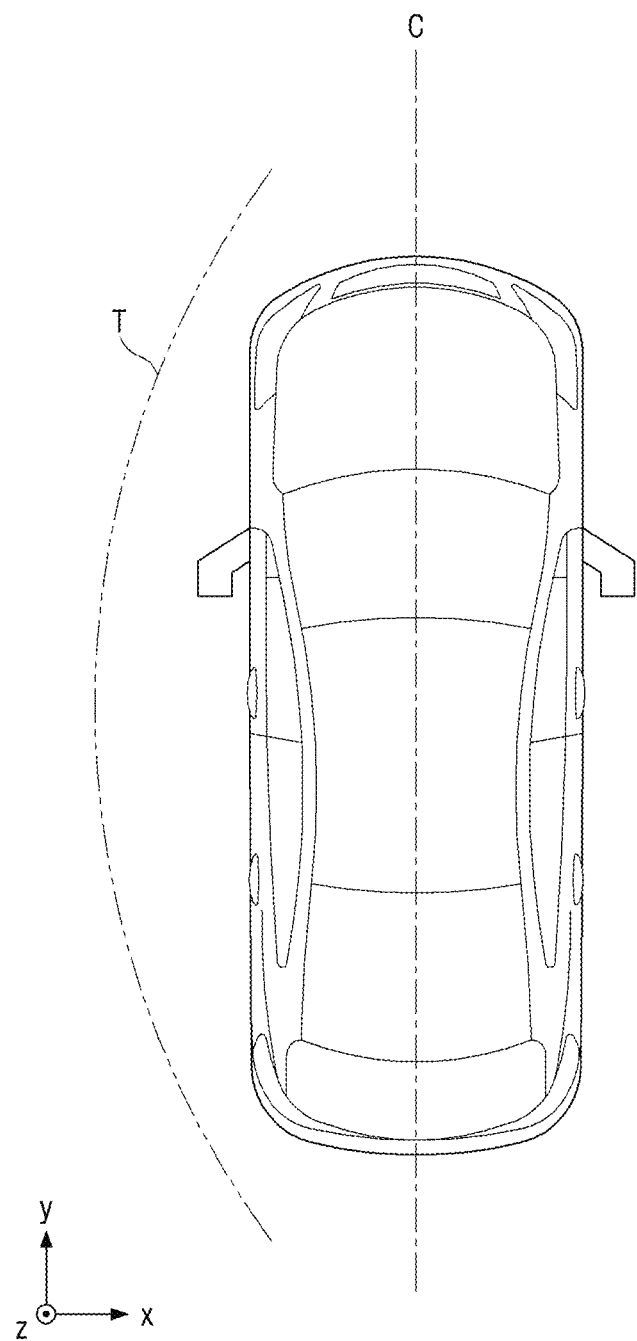
FIG. 7 is a schematic diagram showing a trajectory to which light emitted from a light emitter is irradiated when a movable unit rotates, according to an embodiment of the present disclosure.

In other words, since the aperture 200a extends so as to have the acute angle θ1 with respect to the front-rear direction y, when the movable unit 200 rotates, the position to which the light L emitted from the light emitter 100 is irradiated does not follow a linear trajectory parallel to the front-rear direction y, but follows a curved trajectory T as shown in FIG. 7, wherein a spacing in the left-right direction x between the trajectory T and the central axis C of the vehicle increases or decreases based on the rotation direction and angle of the movable unit 200.

In this regard, in FIG. 7, a case in which as the movable unit 200 rotates, the position where the light L emitted from the light emitter 100 is irradiated moves along the trajectory T, which is curved such that the spacing between the trajectory T and the central axis C of the vehicle is decreased as the trajectory T extends forwards or rewards from a middle point of the vehicle in the front-rear direction y will be described by way of example. However, the present disclosure is not limited thereto. When the movable unit 200 rotates, the position where the light L emitted from the light emitter 100 is irradiated may move along the trajectory T that extends in a curved manner, a linear manner or in a combination thereof such that the spacing between the trajectory T and the central axis C of the vehicle may be decreased as the trajectory T extends forwards or rewards from a middle point of the vehicle in the front-rear direction y.

In an embodiment of the present disclosure, due to the configuration that when the movable unit 200 rotates, the position to which the light from the light emitter 100 is irradiated moves along the curved trajectory T, the spacing in the left-right direction x between a position on the curved trajectory T on the road surface on a side of the vehicle and the vehicle's central axis C may be larger than the spacing in the left-right direction x between the vehicle's central axis C and a position on the curved trajectory T on the road surface in front or rear of the vehicle. Accordingly, the configuration may prevent interference caused by a vehicle body when the road surface pattern is formed on the road surface on the side of the vehicle.

In other words, when the aperture 200a of the movable unit 200 extends in the left-right direction x perpendicular to the front-rear direction y, the position where the light L emitted from the light emitter 100 mounted on one end of the movable unit 200 is irradiated may move along a linear trajectory parallel to the front-rear direction y when the movable unit 200 rotates. Thus, the spacing in the left-right direction x between the trajectory and a center of the road surface pattern may remain constant as the movable unit 200 rotates. However, in an embodiment of the present disclosure, since the aperture 200a extends in the left-right direction x with the acute angle θ1 with respect to the front-rear direction y, the spacing between the position to which the light L emitted from the light emitter 100 is irradiated and the central axis C of the vehicle may vary as the movable unit 200 rotates.

Therefore, while the movable unit 200 is positioned so that the spacing in the left-right direction x between the central axis C of the vehicle and the middle of the road surface pattern formed when the light L emitted from the light emitter 100 is irradiated to the road surface on the side of the vehicle is the largest, the movable unit 200 may be rotated such that the light L emitted from the light emitter 100 is irradiated to the road surface in front or rear of the vehicle so that the spacing in the left-right direction x between the central axis C of the vehicle and the position to which the light L emitted from the light emitter 100 is irradiated may become gradually smaller.

Figure 8:
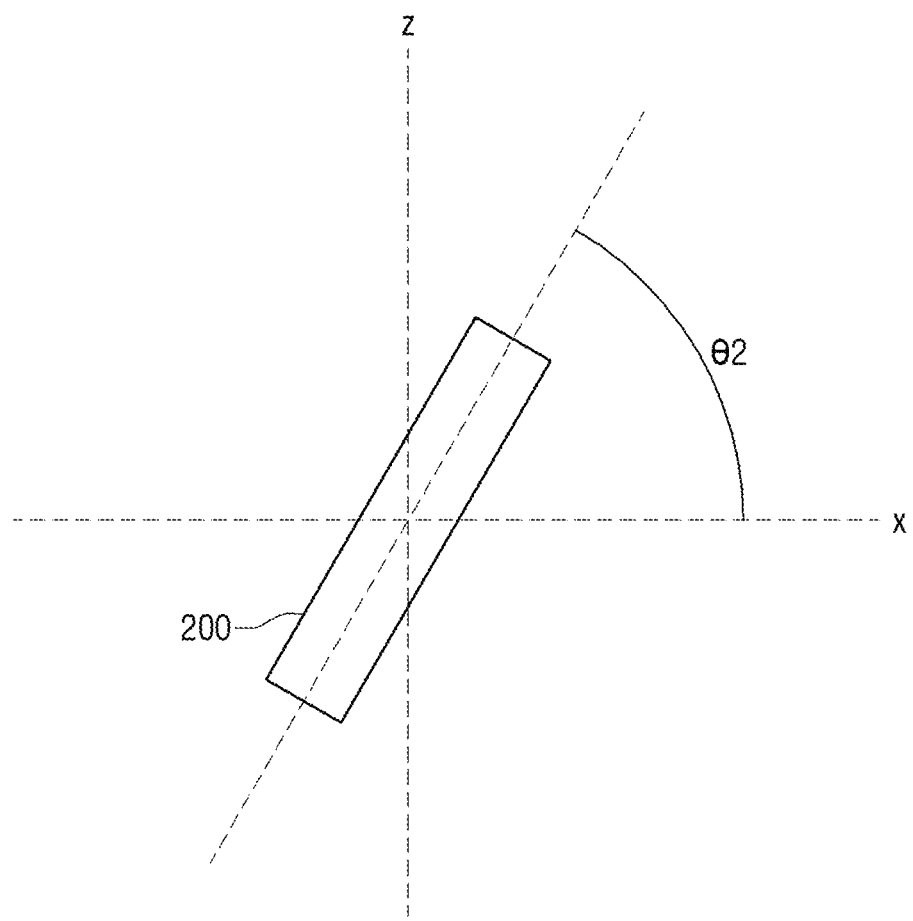
FIG. 8 is a schematic diagram showing a movable unit according to another embodiment of the present disclosure.

FIG. 6 is a top view. Referring to FIG. 6, a case in which the aperture 200a of the movable unit 200 extends in the left-right direction x with the acute angle θ1 with respect to the front-rear direction y has been described by way of example. However, this is merely an example for helping understanding of the present disclosure. The present disclosure is not limited thereto, and the movable unit 200 may be oriented in the up-down (vertical) direction z so as to have an acute angle θ2 with respect to the left-right direction x as shown in FIG. 8. In such case, as in the embodiment shown in FIG. 7 described above, when the movable unit 200 rotates, the position to which the light L emitted from the light emitter 100 is irradiated may also move along the trajectory T, wherein the spacing in the left-right direction x between the trajectory T and the central axis C of the vehicle increases or decreases based on the rotation direction and angle of the movable unit 200.

In this regard, FIG. 8 is a side view and shows an example in which the movable unit 200 is oriented in the up-down (vertical) direction z so as to have the acute angle θ2 with respect to the left-right direction x. In such case, even though the aperture 200a extends along the left-right direction x, the position to which the light L emitted from the light emitter 100 is irradiated may still follow the trajectory T due to the orientation angle of the movable unit 200, and the spacing in the left-right direction x between the trajectory T and the central axis C of the vehicle may increase or decrease based on the rotation direction and angle of the movable unit 200.

In an embodiment of the present disclosure, a case in which the movable unit 200 is oriented in the vertical direction z so as to have the acute angle θ2 with respect to the left-right direction x has been described by way of example. However, the present disclosure is not limited thereto, and the movable unit 200 may be oriented so as to have an acute angle with respect to at least one of the vertical direction z, the left-right direction x, or the front-rear direction y.

In the above-described embodiment, a case where the aperture 200a of the movable unit 200 extends having the acute angle θ1 with respect to the front-rear direction y, and the movable unit 200 is oriented in the vertical direction z having the acute angle θ2 with respect to the left-right direction x have been described. However, the present disclosure is not limited thereto. When the movable unit 200 is oriented in the vertical direction z having an acute angle with respect to the left-right direction x, the aperture 200a may extend with an acute angle with respect to at least one of the vertical direction z, the left-right direction x, or the front-rear directions y.

Figure 9:
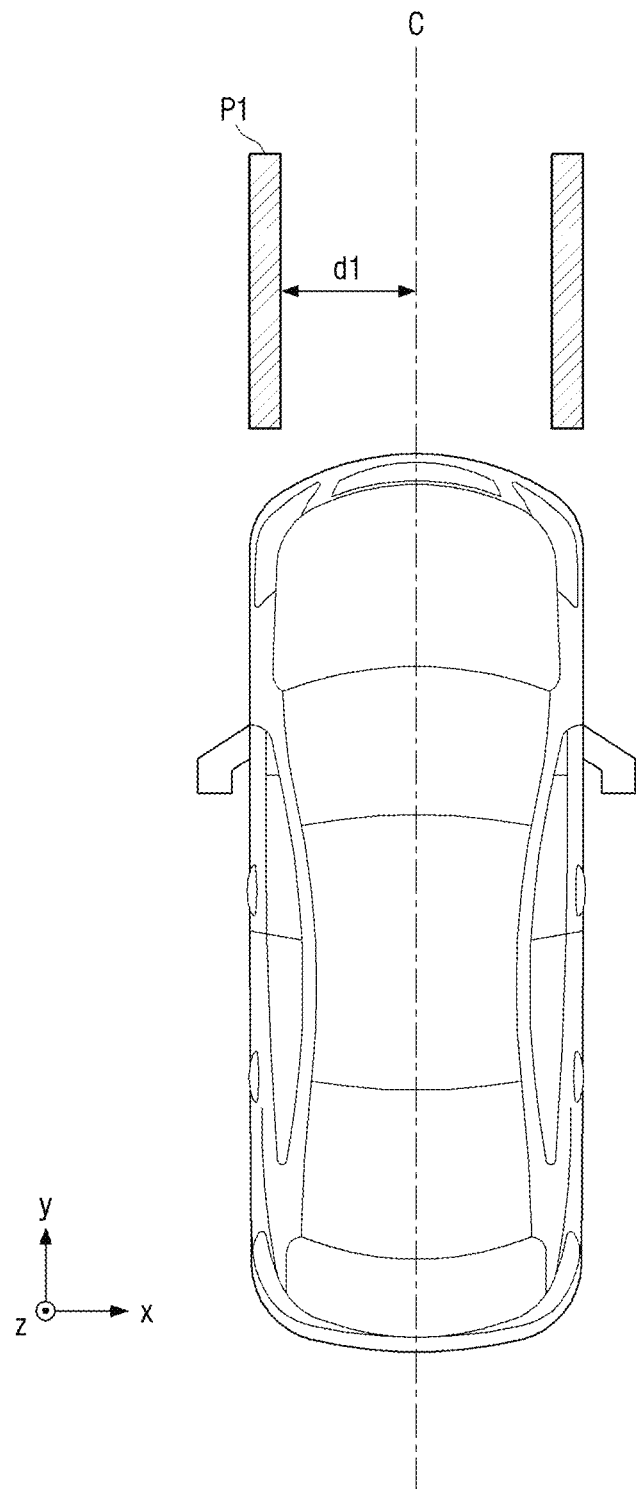
FIGS. 9 to 11 are schematic diagrams showing road surface patterns formed by a vehicle lamp according to an embodiment of the present disclosure.
Figure 10:
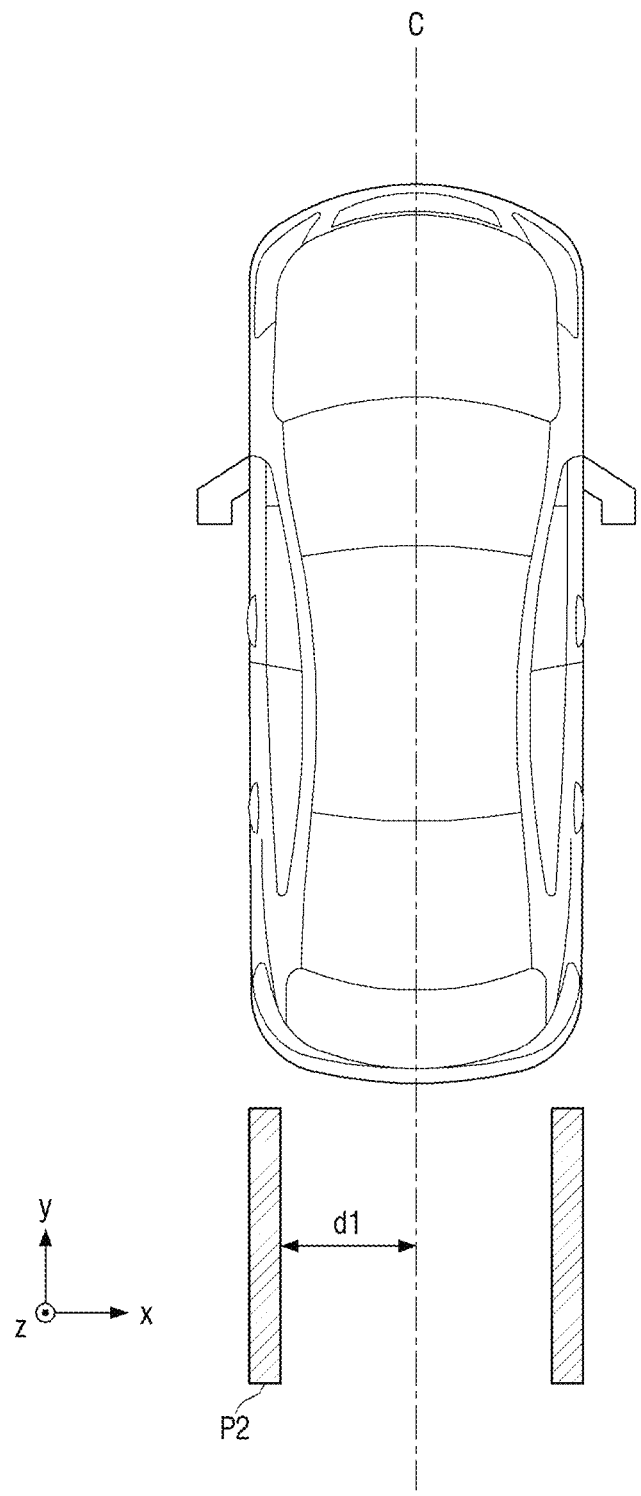
Figure 11:
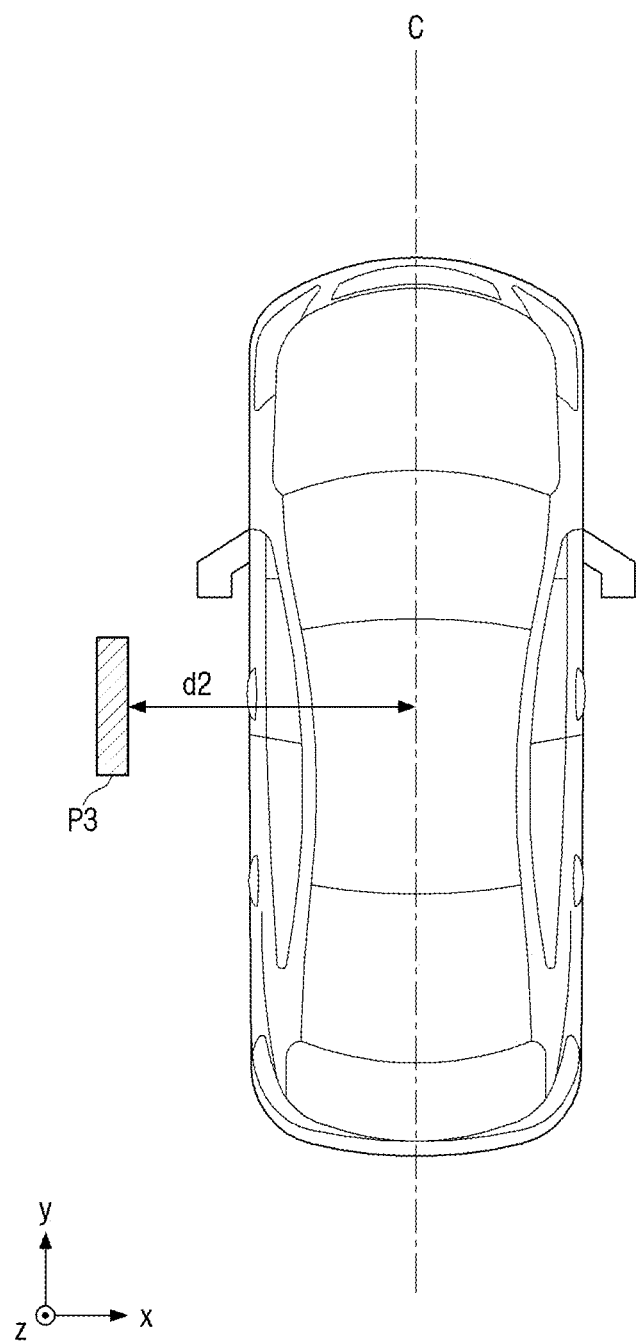

FIGS. 9 to 11 are schematic diagrams showing road surface patterns formed by a vehicle lamp according to an embodiment of the present disclosure. Referring to FIGS. 9 to 11, depending on the position of the movable unit 200, the vehicle lamp 1 according to an embodiment of the present disclosure may form one of a first road surface pattern P1 formed on a front road surface in front of the vehicle, a second road surface pattern P2 formed on a rear road surface in rear of the vehicle, or a third road surface pattern P3 formed on a side road surface on a side of the vehicle.

In this regard, as the third road surface pattern P3 is formed on the side road surface on the side of the vehicle, if the third road surface pattern P3 is formed along the same line as the first road surface pattern P1 and the second road surface pattern P2, interference may occur due to the vehicle body, and the third road surface pattern P3 may not be formed on the road surface on the side of the vehicle.

Therefore, in an embodiment of the present disclosure, a spacing d2 in the left-right direction x between the center of the third road surface pattern P3 and the central axis C of the vehicle may be larger than a spacing d1 in the left-right direction x between the center of each of the first road surface pattern P1 and the second road surface pattern P2 and the central axis C of the vehicle. This configuration may prevent the third road surface pattern P3 from not being properly formed due to the interference by the vehicle body.

In FIG. 9 and FIG. 10 as described above, a case where the spacing in the left-right direction x between the center of the first road surface pattern P1 and the central axis C of the vehicle is equal to the spacing in the left-right direction x between the center of the second road surface pattern P2 and the central axis C of the vehicle has been described by way of example. However, this is merely an example to help understanding of the present disclosure. The present disclosure is not limited thereto, and the first road surface pattern P1 and the second road surface pattern P2 may be laterally spaced apart from the central axis C of the vehicle by different distances.

In an embodiment of the present disclosure, a case in which the first road surface pattern P1 is used as a turn signal and to indicate a vehicle width, the second road surface pattern P2 is used for warning in a reverse driving, for door open warning, or for U-turn warning, and the third road surface pattern P3 is used for a welcome function, a puddle lamp, or the like will be described by way of example. However, this is only an example to help understand the present disclosure. The present disclosure is not limited thereto, and the applications of the first to third road surface patterns P1, P2, and P3 may be variously modified. Further, shapes of the first to third road surface patterns P1, P2, and P3 may vary according to the applications of the first to third road surface patterns P1, P2, and P3.

In this regard, in the above embodiment, a case where the first to third road surface patterns P1, P2, and P3 are used for different purposes has been described by way of example. However, the present disclosure is not limited thereto, and two or more of the first to third road surface patterns P1, P2, and P3 may be used for a single purpose, or one of the first to third road surface patterns P1, P2, and P3 may be used for two or more purposes.

Further, in an embodiment of the present disclosure, a case in which the movable unit 200 is rotated around the shaft 210 as a rotation axis to allow one of the first to third road surface patterns P1, P2, and P3 to be formed will be described by way of example. This is just an example for helping understanding of the present disclosure. The present disclosure is not limited thereto, and the position of the movable unit 200 may be adjusted via a rotational motion, a linear motion, or a combination thereof, and thus, depending on the direction in which the position of the movable unit 200 is adjusted, various types of actuators such as a motor or a solenoid may be used.

In the above-described embodiment, a case in which the aperture 200a of the movable unit 200 extends in the left-right direction x with the acute angle θ1 with respect to the front-rear direction y, or the movable unit 200 is mounted so as to be oriented in the vertical direction z with the acute angle θ2 with respect to the left-right direction x, and the movable unit 200 rotates such that the position to which the light L emitted from the light emitter 100 is irradiated may move in the front-rear direction y, and at the same time, the spacing in the left-right direction x between the position and the central axis C of the vehicle varies has been described by way of example. However, the present disclosure is not limited thereto, and the propagation direction of the light emitted from the light emitter 100 and the position to which the light is irradiated may be made different from one another by adjusting the position of the mirror 130 as described above.

For example, even when a position to which the light L emitted from the light emitter 100 is irradiated is displaced along a linear trajectory parallel to the front-rear direction y when the movable unit 200 rotates, the spacing in the left-right direction x between the central axis C of the vehicle and a center of each of the first to third road surface patterns P1, P2, and P3 may be varied by adjusting the position of the mirror 130, as shown in FIG. 7.

Therefore, in the vehicle lamp 1 of the present disclosure, the spacing in the left-right direction x between the central axis C of the vehicle and a center of each of the first to third road surface patterns P1, P2, and P3 may be adjusted based on at least one of the orientation angle of the aperture 200a, the orientation angle of the movable unit 200, or the adjustment of the position of the mirror 130.

Figure 12:
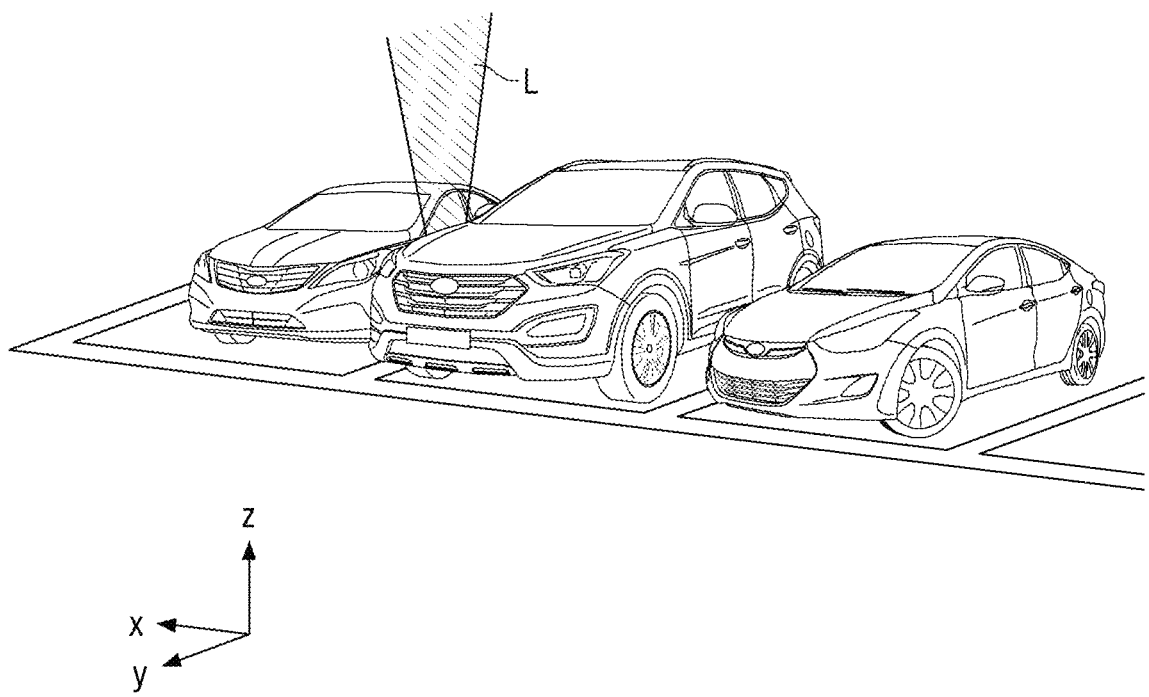
FIG. 12 is a schematic diagram showing light irradiated upwardly from a vehicle lamp according to an embodiment of the present disclosure.

In above examples, a case where the lamp 1 for a vehicle according to the present disclosure forms a road surface pattern on a road surface around the vehicle has been described by way of example. However, the present disclosure is not limited thereto, and the rotation of the movable unit 200 may cause the light to be irradiated upward of the vehicle. In such case, the driver may more easily locate the vehicle in a parking lot or the like due to the light emitted upwardly from the light emitter 100. As such, when several vehicles are parked as shown in FIG. 12, the driver may locate the vehicle more easily due to the light L irradiated upwardly from the light emitter 100.

As described above, the vehicle lamp 1 according to the present disclosure may be configured to irradiate light onto the front, side, and rear road surfaces around the vehicle, and also upwardly. In this regard, to prevent glare toward a driver of a vehicle in front of the vehicle or a vehicle driving in an opposite direction, the movable unit 200 may be rotated in a range of about 270 degrees and may be rotated from a direction facing the front of the vehicle to a direction toward the road surface, and then to the upward direction, and it may be also rotated in the opposite direction. The range of rotation angle of the movable unit 200 is not limited to the above example, and the range of rotation angle may vary depending on a direction in which the light from the vehicle lamp 1 according to the present disclosure is to be irradiated.

As described above, in the vehicle lamp 1 according to the present disclosure, a single light emitter 100 and a single movable unit 200 may be used to allow road surface patterns to be respectively formed at different locations on the road surface around the vehicle. The direction in which the light is radiated from the lamp 1 for the vehicle of the present disclosure may be adjusted with the single light emitter 100 and the single movable unit 200. Thus, the configuration of the lamp may be simplified, and at the same time, the light may be radiated to different positions around the vehicle.

Further, in the vehicle lamp 1 according to the present disclosure, the distances between the vehicle's central axis C and the centers of the road surface patterns formed on different locations may be made different from one another, so that interference with the vehicle body may be avoided.

A person of ordinary skill in the technical field to which the present disclosure belongs will be able to understand that the present disclosure may be implemented in other forms without departing from the technical spirit or essential characteristics thereof. Therefore, the embodiments described above should be understood as not limiting but illustrative in all respects. All changes or modifications derived from the meaning and scope of the claims and their equivalent concepts should be interpreted to be included in the scope of the present disclosure.

What is claimed is:

1. A vehicle lamp comprising:
   a light emitter that emits light to form a road surface pattern; and
   a movable unit on which the light emitter is mounted,
   wherein a position of the road surface pattern formed by the light emitter around the vehicle is adjustable as the movable unit rotates,
   wherein the light emitter includes:
   a light source unit for emitting first light;

a light adjuster for generating second light having a different light concentration from the first light; and a mirror for reflecting the second light to a position where the road surface pattern is to be formed, and wherein the light source unit includes:

a plurality of light sources for respectively emitting light beams of different wavelengths; and an optical member for synthesizing the light beams emitted from the plurality of light sources to generate the first light.

2. The vehicle lamp of claim 1, wherein the light source unit further includes a plurality of light path adjusters for respectively adjusting light paths of the light beams respectively emitted from the plurality of light sources to cause the light beams to propagate parallel to one another.

3. The vehicle lamp of claim 2, wherein a distance between one of the plurality of light sources and corresponding one of the plurality of light path adjusters is configured based on a wavelength of each light beam emitted from the one of the plurality of light sources.

4. The vehicle lamp of claim 1, wherein the light adjuster includes a plurality of lenses arranged along a propagating direction of the first light.

5. The vehicle lamp of claim 4, wherein the plurality of lenses have different effective areas.

6. The vehicle lamp of claim 4, wherein the plurality of lenses have different curvatures.

7. The vehicle lamp of claim 1, further comprising a housing for accommodating at least one of the light source, the light adjuster, or the mirror, and wherein the housing has at least one opening defined therein to allow light propagating within the light emitter to be inspected.

8. The vehicle lamp of claim 1, wherein the movable unit is installed at an outside mirror disposed at each of both opposing sides of the vehicle.

9. The vehicle lamp of claim 1, wherein the position of the road surface pattern formed on the road surface moves in a front-rear direction of the vehicle as the movable unit rotates.

10. The vehicle lamp of claim 1, wherein the movable unit includes an aperture that extends in a direction so as to have an acute angle with respect to at least one of a front-rear direction, a vertical direction, or a left-right direction of the vehicle, and wherein a shaft is inserted into the aperture, serving as a rotation axis of the movable unit.

11. The vehicle lamp of claim 1, wherein the movable unit is oriented so as to have an acute angle with respect to at least one of a front-rear direction, a vertical direction, or a left-right direction of the vehicle.

12. The vehicle lamp of claim 1, wherein, as the movable unit rotates, the position of the road surface pattern is adjusted such that a spacing in a left-right direction of the vehicle between a central axis passing through a center of the vehicle in a front-rear direction of the vehicle and a center of the road surface pattern is varied.

13. The vehicle lamp of claim 12, wherein the road surface pattern is formed on one of a front road surface in front of the vehicle, a side road surface on a side of the vehicle, or a rear road surface in rear of the vehicle, based on a position of the movable unit, and wherein a spacing in the left-right direction between a center of a road surface pattern formed on the side road surface and the central axis of the vehicle is larger than a spacing in the left-right direction between a center of a road surface pattern formed on the front road surface or the rear road surface and the central axis of the vehicle.

14. The vehicle lamp of claim 1, wherein the movable unit is rotatable to allow the light emitted from the light emitter to be irradiated upwardly.

15. The vehicle lamp of claim 1, wherein the movable unit is rotatable in a range of about 270 degrees.

* * * * *